No. 638,895. Patented Dec. 12, 1899.
G. H. WALLIS.
ELECTRICAL TREE.
(Application filed Sept. 21, 1899.)
(No Model.)
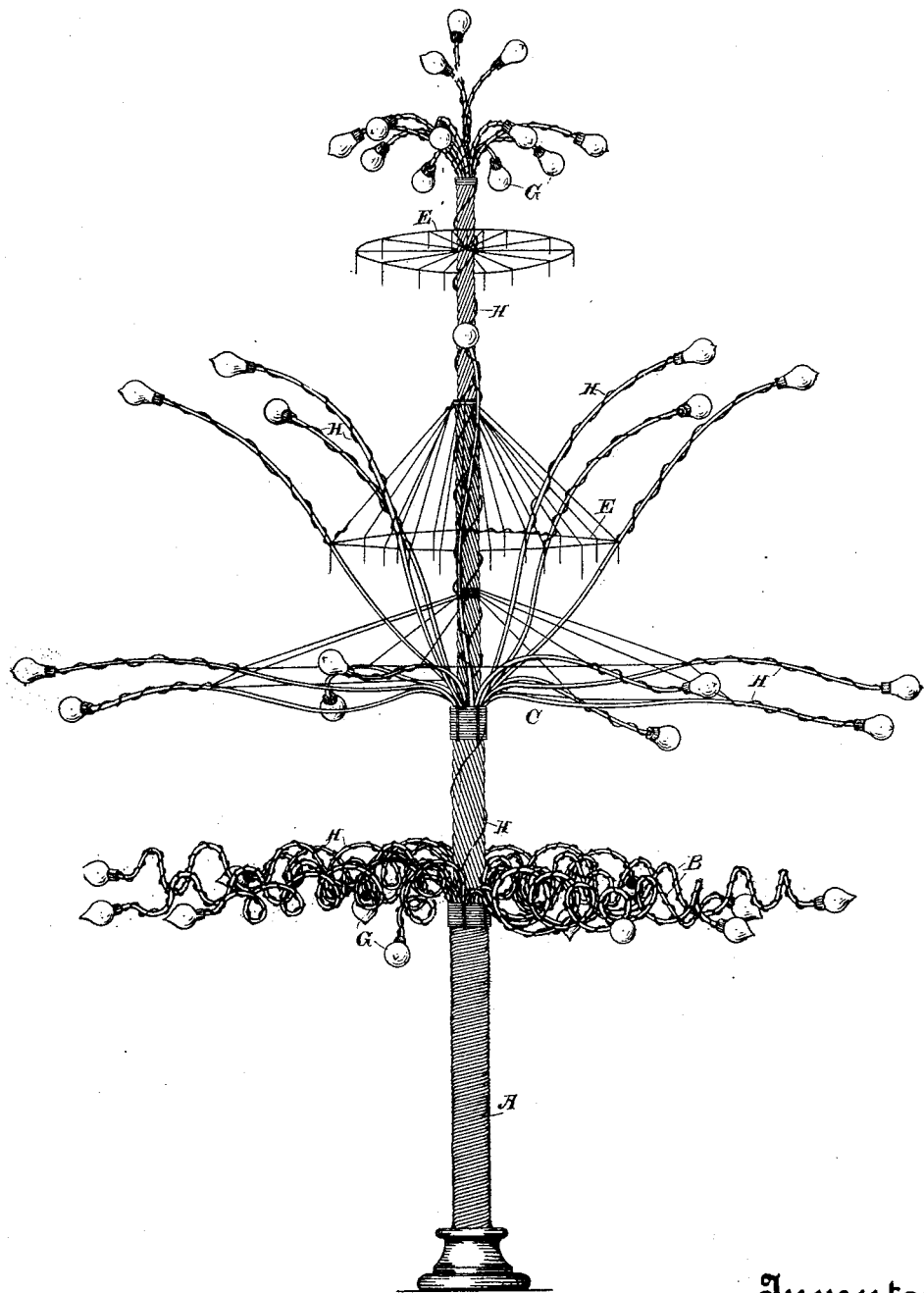
Witnesses,
Inventor,
George H. Wallis
By Dewey Strong & Co.
Attys

UNITED STATES PATENT OFFICE.

GEORGE H. WALLIS, OF SAN FRANCISCO, CALIFORNIA, ASSIGNOR TO THE WASHBURN & MOEN MANUFACTURING COMPANY, OF WORCESTER, MASSACHUSETTS.

ELECTRICAL TREE.

SPECIFICATION forming part of Letters Patent No. 638,895, dated December 12, 1899.

Application filed September 21, 1899. Serial No. 731,166. (No model.)

*To all whom it may concern:*

Be it known that I, GEORGE H. WALLIS, a citizen of the United States, residing in the city and county of San Francisco, State of California, have invented an Improvement in Electrical Trees; and I hereby declare the following to be a full, clear, and exact description of the same.

My invention relates to a construction which is designed to provide a tree-like form for illuminated display purposes.

It consists, essentially, in the formation of a tree from the parts of an insulated and armored cable such as is used for submarine purposes.

It also comprises details of construction, which will be more fully explained by reference to the accompanying drawing, in which the figure is a general view of the tree and its construction.

The object of this invention is to provide a simple and effective contrivance for display and for converting it into the form of a tree. For this purpose I employ a submarine cable of any usual or suitable construction. As here shown, the body A of the tree is composed of such cable, with the protecting or armored wires coiled around its exterior. This body may be supported in any suitable stand or by any such convenient or desired means as may be had. The exterior armor-wires are untwisted and cut off to such lengths as it is desired to have the lower branches B of the tree and are then spread out in any regular or irregular form, as may be desired. An interior set of these wires or interior coatings are then stripped down in the same manner to form another series of branches above the lowermost, as shown at C, and so on upwardly toward the top of the tree.

I have here shown rings E surrounding the body of the tree, which has been formed, as above described, at different points, and they may be supported by the untwisted threads of the jute or other fibrous wrapping or covering which incloses the interior and conducting portion of the cable. These rings are arranged at suitable distances apart, and the branches which extend outwardly from the body of the tree may, if desired, be attached to or supported by the rings, or in some cases the branches may be sufficiently stiff to support themselves. Upon each of these branches, at the outer end, is mounted an incandescent-light globe G, and these globes may also be arranged at different points around and over the tree thus constructed.

The wires H are the interior conducting-wires of which the cable is made. These wires being sometimes very numerous, they are simply carried up and made to complete the circuits through the incandescent globes in such series as may be desired, each set of wires having an independent connection with a series of the lights. In this manner the current is supplied to light up the tree thus artificially formed, and it makes a very beautiful appearance.

Having thus described my invention, what I claim as new, and desire to secure by Letters Patent, is—

1. An electrical tree, comprising a body formed of submarine or similar cable, branches formed by untwisting wires of the cable and extending them outwardly from the body, electric lights fixed to said branches, and circuit-wires through which the current is supplied thereto.

2. An electrical tree consisting of a body formed of a cable, branches formed by untwisting the wires thereof and projecting them outwardly from the body at intervals between the bottom and top, rings or supports surrounding the body and suspended therefrom, electric lights fixed upon the branches of the tree and conductors leading to said lights and formed from the interior conducting-wires of the cable itself.

In witness whereof I have hereunto set my hand.

GEORGE H. WALLIS.

Witnesses:
E. H. THARP,
P. BOLAND.